Jan. 26, 1937.  H. G. THUNDER  2,069,102
VEHICLE VENTILATING DEVICE
Filed Dec. 24, 1934  3 Sheets-Sheet 2
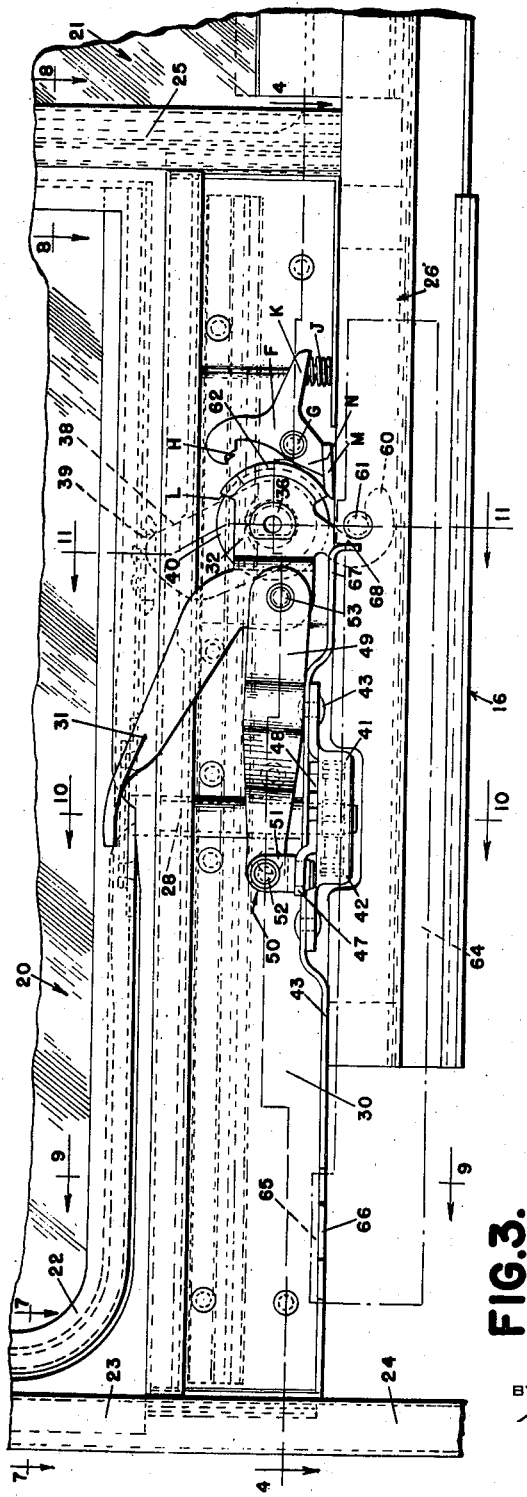
INVENTOR
HAROLD G. THUNDER
BY
ATTORNEYS Jan. 26, 1937.  H. G. THUNDER  2,069,102
VEHICLE VENTILATING DEVICE
Filed Dec. 24, 1934   3 Sheets-Sheet 3
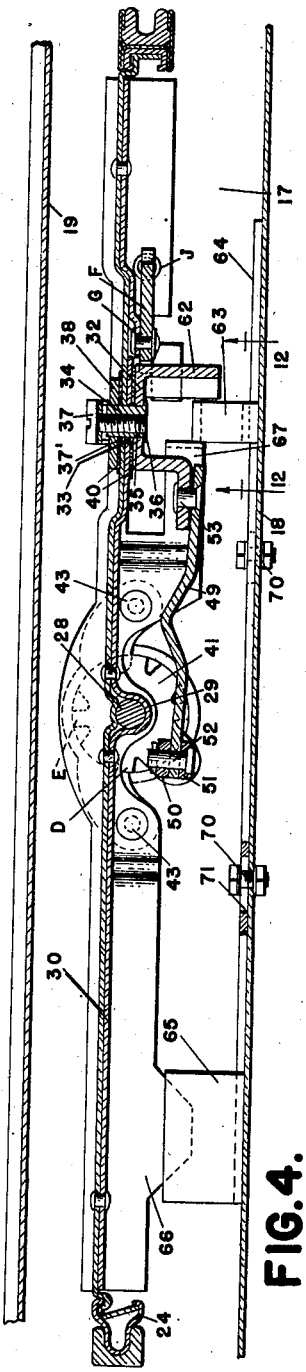
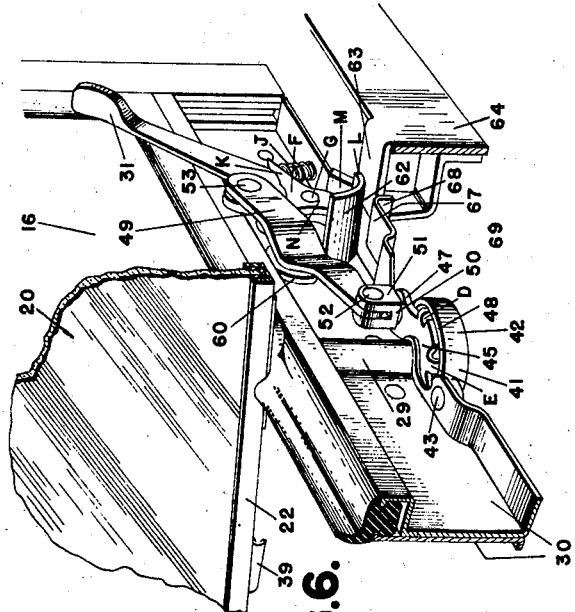
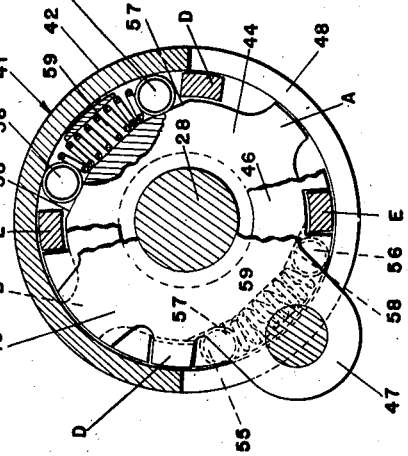
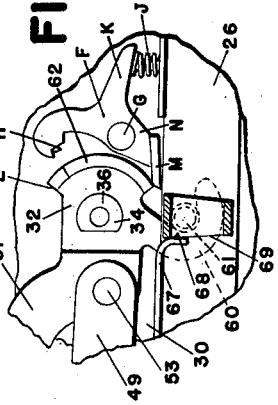
INVENTOR
HAROLD G. THUNDER
ATTORNEYS Patented Jan. 26, 1937

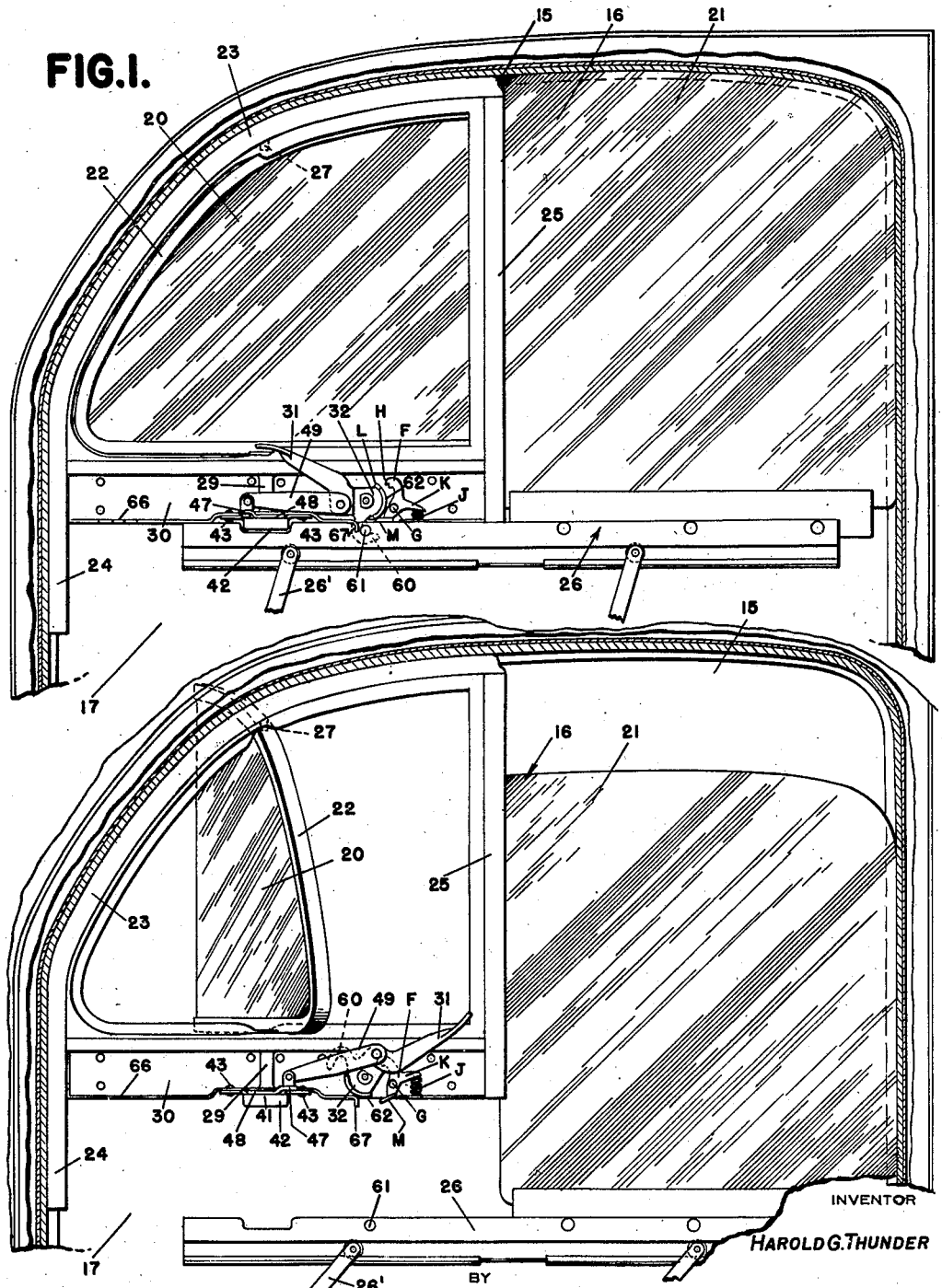

2,069,102

UNITED STATES PATENT OFFICE 2,069,102

VEHICLE VENTILATING DEVICE

Harold G. Thunder, Detroit, Mich., assignor to Motor Products Corporation, Detroit, Mich., a corporation of New York Application December 24, 1934, Serial No. 759,096

13 Claims. (Cl. 296—44)

This invention relates generally to ventilating systems for vehicle bodies and refers more particularly to improvements in the construction of ventilating windows.

The invention concerns itself more particularly with that type of ventilating window embodying pivoted and sliding panels operable independently of one another in effecting the control of the ventilating window, but capable of being connected to each other in order to permit the same to be simultaneously raised into or lowered from the window opening as a unit. A ventilating window of the general type briefly set forth is shown in the Kellogg pending application, Serial No. 740,013, filed August 15, 1934, and it is proposed in this latter application to appreciably simplify the control of the ventilating window by providing a single control means for angularly adjusting the pivoted panel; securing the pivoted panel in the normal plane of the opening; coupling the window panel with the window lifter mechanism; and uncoupling the window panel from the latter mechanism.

The present invention contemplates securing the advantages set forth in the above identified Kellogg pending application with an improved construction considerably simpler to manufacture, assemble and install. Thus the principal objects of this invention reside in the novel construction and arrangement of parts, which will be made more apparent as this description proceeds, especially when considered in connection with the accompanying drawings, wherein:

Figure 1 is a fragmentary elevational view of a ventilating window as observed from the inside of the vehicle;

Figure 2 is a view similar to Figure 1, showing the parts in a different position;

Figure 3 is an enlarged fragmentary elevational view featuring the mechanism for operating the ventilating window;

Figure 4 is a longitudinal sectional view taken on the plane indicated by the line 4—4 of Figure 3;

Figure 5 is a plan view, partly in section, of the clutch employed in operating the pivoted panel of the ventilating window;

Figure 6 is a fragmentary perspective view, partly in section, of the pivoted panel and operating mechanism for the ventilating window;

Figure 7 is a cross sectional view taken substantially on the plane indicated by the line 7—7 of Figure 3;

Figure 8 is also a cross sectional view taken on the plane indicated by the line 8—8 of Figure 3;

Figures 9, 10, and 11 are cross sectional views taken on the planes indicated by the lines 9—9, 10—10, and 11—11 of Figure 3;

Figure 12 is a fragmentary sectional view taken substantially on the line 12—12 of Figure 4.

Referring now to the drawings, it will be noted that there is illustrated in Figure 1 a portion of a vehicle body having a window opening 15 therein normally closed by a substantially vertical sliding ventilating window 16 movable from a position within the opening to a position within a compartment 17 formed beneath the opening by the laterally spaced inner and outer body panels 18 and 19 respectively. The ventilating window is provided with a pivoted panel 20 preferably located in the front portion of the window opening, and with a sliding panel 21 cooperating with the pivoted panel to close the window opening. As will be more fully hereinafter set forth, the pivoted panel 20 is also capable of sliding movement with respect to the window opening, and the construction is such as to permit the pivoted and sliding panels to be moved into or out of the window opening, either as a unit or independently of one another.

The pivoted panel 20 may be provided with a frame 22 mounted on substantially vertical pivots located intermediate the front and rear edges of the panel, on a frame 23. The frame 23 is provided with a depending extension 24 slidable in the usual glass channel at one edge of the compartment 17, and is also formed with a vertically arranged frame member 25 positioned for engagement by the rear edge of the pivoted panel 20 in the closed position of the latter. As shown in Figure 8, the cross sectional contour of the frame member 25 is such as to provide a rearwardly opening groove extending for the full length of the frame member and adapted to slidably receive the forward edge of the sliding glass panel 21. The rear edge of the sliding glass panel 21 engages the conventional glass channel at the corresponding edge of the window opening. Secured to the lower edge of the sliding glass panel 21 is the customary glass retainer 26 fashioned for engagement with the usual rollers carried by the lifter arms 26' of the usual window regulator mechanism for raising and lowering the sliding panel 21. The regulator mechanism and operating means therefor may be of conventional or standard construction, and accordingly, is not shown in detail in this application.

Insofar as the present invention is concerned, it suffices to state that means is provided for coupling the frame 22—23 together with the pivotal panel 20 to the glass retainer 26, so that both the pivoted and sliding panels may be raised and lowered as a unit in much the same manner as conventional windows are operated in vehicle bodies. However, means is also provided for uncoupling the pivoted panel 20 from the lifter mechanism and securing the same to the window casing or body structure in registration with the window opening, so that the pivoted panel may be angularly adjusted and the sliding panel 21 may be raised and lowered independently thereof, as desired. By reference to Figure 1, it will be noted that the upper pivot for the pivoted panel 20 is designated by the reference character 27, and by reference to Figure 10, it will be noted that the lower pivot is designated by the reference character 28. As shown in this latter figure, the lower pivot 28 is in the form of a shaft rotatably journaled in a bearing 29 formed by a pair of plates 30 comprising the lower boundary of the frame 23. The plates are rigidly secured back-to-back in the manner clearly shown in Figure 4, and both plates are suitably formed to cooperate in providing the bearing 29.

The upper end of the shaft 28 is secured to the frame 22 of the pivoted panel 20, so that when rotary movement is applied to the shaft 28 the pivoted panel will be swung about the axis of the two pivots 27 and 28. The rotary movement required to swing the pivoted panel 20 about the aforesaid axis is imparted to the shaft 28 by means of a control handle 31 mounted for swinging movement in a substantially vertical plane and operatively connected to the shaft 28 for rocking the latter.

As shown particularly in Figures 4, 6, and 11, the handle 31 is mounted on the plates 30 upon the inner side of the latter for rocking movement about a substantially horizontal axis. In detail, the handle 31 is provided with a hub portion 32 having an opening therethrough registrable with aligned openings 33 in the plates 30 to provide for the passage of a fitting 34 therethrough. The opening through the hub portion 32 is formed with a flat side 35 for engagement with a corresponding flat side of the fitting 34 to secure the latter against rotation relative to the hub portion 32, and the inner end of the fitting is peaned over the hub portion in the manner designated by the reference character 36. If desired, the fitting may have a pressed fit with the opening through the hub portion of the handle so as to form an assembly therewith and permit mounting the same upon the plates 30 by extending the fitting through the aligned openings 33 provided in the plates. As will also be apparent from Figure 4, the fitting is drilled and tapped for threadably receiving a screw 37 operable to secure the handle and fitting in assembled relation to the plates 30. The head of the screw 37 is accessible from the outer side of the plates 30 and engages a collar 37', which in turn is clamped by the screw against a latch member 38 sleeved upon the outer extremity of the fitting 34. The latch 38 is also provided with a flat side for engaging the flat side of the fitting and serves as an abutment for engaging the lower edge of the pivoted panel 20 when the latter is in its closed position to prevent accidental swinging of the same about the pivots 27 and 28. The construction is such as to provide for rocking movement of the latch member 38 as a unit with the handle 31 and the latch member is so designed that when the handle 31 is moved to its lowermost position shown in Figure 1, the latch member automatically engages an abutment 39 fixed to the lower edge of the swinging panel to prevent pivotal movement of the latter. In order to permit relatively free operation of the handle 31, and at the same time avoid end play of the handle assembly, suitable flat disks 40 are interposed between the hub portion 32 of the handle and inner surface of the plates 30, and between the outer surface of the latter plates and the latch member 38.

It will, of course, be understood that the pivoted panel 20 is completely closed before the latch member 38 is moved to its operative position shown in Figure 11, and as previously stated, the pivoted panel is closed by the handle 31. For accomplishing this result, the handle 31 is operatively connected to the shaft 28 by means of suitable mechanism including a two-way clutch 41. The clutch 41 comprises a cup-shaped housing 42 opening upwardly and having the base portion fixedly secured to an inturned flange on the lower edge of the innermost plate 30 by means of rivets 43. The base portion is centrally apertured to receive the lower end of the shaft 28 and the side wall of the housing is concentrically disposed with reference to the axis of the shaft. Non-rotatably fixed to the lower end of the shaft 28 within the housing is a clutch part 44 operatively connected to the handle 31 through the medium of mechanism including a cooperating clutch part 45 journaled on the shaft 28 above the part 44. The clutch part 45 is normally yieldably urged into engagement with the lower flanged edges of the plates 30 by means of a spring disk 46 interposed between the two clutch parts in the manner clearly shown in Figure 10.

The clutch 45 is provided with a radially extending horizontally disposed lug 47 projecting out of the housing 42 through a semi-circular cut-away portion 48 in the upper edge of the side wall of the housing and connected to the handle 31 by a link 49. As shown particularly in Figure 6, a bracket 50 is pivoted to the outer extremity of the lug for rocking movement about a vertical axis and is provided with a bifurcated portion 51 for receiving the forward end of the link 49. The latter end of the link 49 is pivoted to the furcations of the bracket by a pin 52 having its axis extending at substantially right angles to the axis of rocking movement of the bracket 50 and the opposite end of the link is pivoted to the handle 31 by a pin 53 having its axis substantially parallel to the axes of the pin 52 and the fitting 34 mounting the operating handle 31 on the plates 30. The pin 53 is positioned adjacent the pivotal connection of the operating handle to the plates and is so located with respect to the latter connection and pin 52 that during the final part of the movement of the handle in a downward direction to close the pivoted panel, the pivot pin 52 is moved past the plane which intersects the axis of the pin 52 and the axis of the pivotal mounting for the handle so as to lock the latter in its downwardmost position, wherein the pivoted panel is closed. This locking feature supplements the action of the latch 38, previously prescribed, in holding the panel in its closed position and the importance of this function will be apparent as this description proceeds.

It will, of course, be understood from the foregoing description, especially when considered in connection with Figure 3, that the pivot pin 53 travels around the axis of the fitting 34 upon rocking the operating handle 31 and in so doing effects a rocking movement of the clutch part 45 in a direction depending upon whether the handle 31 is moved up or down. The clutch part 45 has been described as rotatably mounted on the shaft 28 within the clutch housing 42, and in order to rock the panel 20, fixed to the shaft 28, it is necessary to establish a driving connection between the clutch parts 45 and 44 in both directions.

The foregoing is accomplished herein by forming two projections A and B extending laterally outwardly from opposite sides of the clutch part 44. Cooperating with the projections A and B are two pairs of depending projections D and E on the clutch part 45 so arranged with respect to the projections on the clutch part 44 that rotation of the former part in a counter-clockwise direction, as viewed in Figure 5 of the drawings, engages the projections E on the clutch part 45 with the projections A and B on the clutch part 44 to rotate the latter in a corresponding direction. On the other hand, rotation of the clutch part 45 in a clockwise direction by the handle 31 engages the projections D with the projections A and B to move the clutch part 44 in the same direction. In the present illustration of the mechanism rotation of the clutch part 45 in a counter-clockwise direction is effected by raising the handle from its locked position shown in Figure 1, and serves to open the pivoted panel, while rocking movement of the clutch part 45 in the opposite or clockwise direction is accomplished by downward movement of the handle 31 and, of course, serves to close the pivoted panel.

In order to positively hold the pivoted panel in any one of its various adjusted positions relative to the window opening provision is made herein for automatically locking the clutch part 44 against movement by any means other than the operating handle 31. This is accomplished in the present instance by providing two pairs of rollers 55 and 56 located within the housing 42 for engagement with the cam faces 57 and 58, respectively, on the clutch part 44. The rollers of each pair and corresponding cam faces are diametrically opposed with respect to the axis of the shaft 28 in the manner clearly shown in Figure 5 of the drawings. The rollers on the same side of the axis of the shaft 28 are normally urged along their respective cam faces in directions away from each other by means of springs 59 carried by the clutch part 44 between the rollers, and the inclination of the cam faces is so determined with respect to the diameter of the rollers that when the latter are in their normal, or outermost positions, they become wedged between the cam faces and side walls of the housing preventing rotation of the clutch part 44 in either direction.

By reference to Figure 5, it will be apparent that the diametrically opposed projections D on the clutch part 45 are so located with respect to the pair of rollers 55 that when the operating handle 31 is raised to rock the part 45 in a counter-clockwise direction, the projections D automatically move the rollers 55 out of wedging engagement before the projections E engage the projections A and B on the cooperating clutch part 44 to drive the shaft 28 in a direction to open the pivoted panel. It will be understood that the rollers 56 do not offer interference to counter-clockwise rotation of the clutch part 44, since these rollers automatically move out of wedging engagement when the clutch part 44 is rocked in this direction. It will also be observed from Figure 5, that the rollers 56 are positively moved out of wedging engagement by the projections E when the clutch part 45 is rocked in the opposite or clockwise direction prior to engagement of the projections D on the clutch part 45 with the projections A and B on the clutch part 44 to rotate the latter in a corresponding direction.

The frame 23 carrying the pivoted panel 20 is supported within the window opening upon a forward extension of the glass retainer 26 when the sliding panel 21 is in its closed position and, as previously stated, provision is made herein for coupling the pivoted panel to the sliding panel in such a manner as to enable both to be operated as a unit. The foregoing is accomplished in the present instance by forming a hook 60 on the hub portion 32 of the operating handle 31, in the manner clearly shown in Figure 3, for engagement with a pin 61 projecting laterally inwardly from the retainer 26. The location of the hook on the operating handle is such that when the latter is moved downwardly throughout its final path of travel to lock the pivoted panel in its closed position, and to bring the latch 38 into engagement with the abutment on the lower edge of the pivoted panel in the manner shown in Figure 11 of the drawings, the hook is passed beneath the pin 61. Both panels and associated frame structure may then be lowered from or raised into the window opening as a unit, by operating the usual regulator mechanism.

Assuming now that both panels are in their uppermost positions shown in Figure 1, and that it is desired to lower the sliding panel 21 independent of the pivoted panel. When this condition is desired, the operating handle 31 is raised sufficiently to disengage the hook 60 from the pin 61 and to move the latch 34 out of engagement with the pivoted panel 20. At the same time a segment 62, projecting inwardly from the hub portion 32, is moved into engagement with a support 63 fixed relative to the pivoted panel in order to support the latter in the window opening independent of the sliding panel. The segment is arcuate in shape and is concentrically disposed with respect to the axis of rocking movement of the handle 31, and engages the top surface of the support 63 prior to complete disengagement of the hook 60 from the pin 61 so that there will be no danger of accidental displacement of the pivoted panel when the sliding panel is lowered relative thereto. With reference to Figure 6, it will be noted that the top surface of the support 63 is substantially flat and is arranged in a plane tangent to the adjacent arcuate surface of the segment 62 so that the latter surface of the segment will have a rolling engagement with the support 63, permitting the pivoted panel to be adjusted by the operating handle 31 with the minimum resistance when the support 63 is in engagement with the segment. It will, of course, be understood that the circumferential extent of the segment 62 is sufficient to contact with the support 63 in the extreme open position of the pivoted panel 20. As a matter of fact, the only time that the segment 62 is moved out of engagement with the support 63 is when the operating handle 31 is moved to its locked position, wherein the pivoted panel 20 is completely closed. The relative position of the segment 62 and support 63 in the locked position of the handle 31 is clearly shown in Figure 4 and, as will be observed from this figure, a sufficient space is provided between the forwardmost portion of the segment and the cam face 68 on the lug 67 to permit the support to pass therethrough when the pivoted panel is operated as a unit with the sliding panel.

Inasmuch as engagement of the segment 62 with the support 63 is essential to support the pivoted panel 20 in the window opening when the sliding panel 21 is lowered from the window opening, provision is made herein for preventing movement of the operating handle 31 the extent required to disengage the segment from the support. The means for accomplishing this result comprises a dog F pivotally supported upon the plates 30 for swinging movement in a substantially vertical plane by means of a pin G and having an abrupt face H at the upper end forming a shoulder normally urged into the path of travel of the segment by means of a spring J seated upon the inturned flange at the lower edge of the innermost plate 30 and engaging an extension K projecting laterally rearwardly from the dog. The shoulder H is so positioned with respect to the edge L of the segment as to positively engage the latter before the opposite end of the segment disengages the support 63 and, as a consequence prevents further movement of the segment by the operating handle 31. It will, of course, be understood that the dog F functions to perform the above result only when the sliding panel 21 is lowered from its closed position, since in the latter position of the sliding panel, the pivoted panel is supported in the window opening by the glass retainer 26 independent of the segment 62 and cooperating fixed support 63. As a matter of fact, when the sliding panel 21 is in its uppermost position it is desired to provide unrestricted operation of the handle 31 in order to engage the hook 60 with the pin 61, and this is accomplished by automatically releasing the dog F from engagement with the segment when the sliding panel is completely closed. As shown particularly in Figure 3, a horizontally disposed shoe M is fixed to the lower end of a forwardly inclined depending extension N on the dog F in the path of travel of the retainer 26 for engagement thereby. The construction is such that when the sliding panel 21 is closed the retainer engages the shoe M and rocks the dog F against the action of the spring J in a direction to disengage the shoulder H from the edge of the segment. After the foregoing has been accomplished the pivoted panel 20 may be completely closed by depressing the operating handle 31 to its locked position shown in Figure 3, wherein the hook 60 engages the pin 61 and the latch 38 engages the abutment 39 on the lower edge of the pivoted panel 20 in the manner previously set forth.

From the foregoing, it will be apparent that the position of the support 63 relative to the segment 62 is important to the satisfactory operation of the ventilating window, and in the following description one method of insuring properly locating the support with respect to the segment is set forth. In detail, the fixed support 63 is formed integral with a strip 64 secured to the inner surface of the body panel 18 and having an outwardly extending projection 65 at the forward end for engagement with a flange 66 extending inwardly from the lower edge of the innermost plate 30 adjacent the front end of the frame 23 for the pivoted panel 20. By reference to Figure 9, it will be observed that the flange 66 abuts the underside of the projection 65 when the pivoted panel 20 is in its uppermost position within the window opening, and as a consequence, cooperates with the segment 62 and support 63 to prevent any tendency for the pivoted panel to rock in the plane of the window opening.

The outwardly extending projection 63 on the strip 64 in addition to cooperating with the segment 62 in supporting the pivoted panel in the window opening, further cooperates with a lug 67 carried by the frame 23 of the pivoted panel to urge the latter forwardly during the final portion of the movement of the same into the window opening. The lug 67 is formed integral with the innermost plate 30 of the frame 23 and is provided with a depending cam portion 68 for frictionally engaging the front side surface 69 of the support 63. The latter surface is tapered forwardly from the lower end thereof so that as the cam portion 68 rides upwardly upon this surface, the pivoted panel 20 and associated frame 23 are urged in a direction toward the front side of the window opening.

In order to secure the proper cam engagement between the lug 67 and the surface 69 of the support 63, it is necessary to accurately position the support 63 relative to the pivoted panel and its associated frame 23. As shown in Figure 4, the strip 64 carrying the support 63 is mounted upon the inner body panel 18 in such a manner as to permit the strip to be initially adjusted relative to the pivoted panel. In the present instance, the strip 64 is secured to the panel 18 by means of fastening devices 70 extending through elongated slots 71 formed in the strip 64, permitting the strip to be adjusted in the direction of its length and the slots 71 are preferably of slightly greater width than the fastening devices 70 so as to also provide a vertical adjustment of the strip 64. With the above construction, the strip 64 is accurately positioned upon the body panel 18 with reference to the ventilating window unit before rigidly securing the strip in place by first supporting the ventilating window in its normal closed position in the window opening, and thereafter adjusting the strip 64 in such a manner that the projection 65 on the strip engages the upper surface of the flange 66 on the pivoted panel frame and in such a manner that the support 63 engages the underside of the segment 62, as well as the cam portion 68 on the lug 67.

From the foregoing description, it will be apparent that with the present construction the pivoted panel may be angularly adjusted; may be secured to the window casing in registration with the window opening; and may be released from and coupled with the window regulating mechanism, all by the operation of the single control handle 31. Assuming that the pivoted panel and sliding panel are coupled together in the compartment 17 of the body, both panels may be raised by operating the customary window lifter mechanism. When the panels are in complete registration with the window opening, the operating handle 31 may be raised to uncouple the pivoted panel from the regulator mechanism and to secure the pivoted panel to the body through the medium of the support 63 and segment 62. In the present instance, the two operations set forth in the preceding sentence are accomplished during the initial upward movement of the operating handle 31, and before the latter is moved sufficiently to actually operate the clutch 41 sufficiently to open the pivoted panel. As soon as the operating handle 31 is raised sufficiently to engage the segment 62 with the support 63, in the manner set forth above, the sliding panel may be raised and lowered as desired, and the pivoted panel may be angularly adjusted to any one of the number of open positions thereof. Attention may again be called to the fact at this point, that as soon as the sliding panel is lowered with respect to the pivoted panel, the spring J automatically rocks the dog F about the pin G in a direction to move the shoulder H on the dog in the path of travel of the segment, so that this shoulder will engage the edge L of the segment 62 to prevent the segment from being rocked sufficiently to disengage the same from the support 63. When it is again desired to couple the panels together, the sliding panel is raised to its uppermost position, and thereafter the operating handle 31 is moved to its locked position to completely close the pivoted panel and to move the hook 60 into engagement with the pin 61. It will be apparent that during the final portion of the upward movement of the sliding panel, the retainer 26 engages the shoe M on the dog F and rocks the latter against the action of the spring J to move the shoulder H out of the path of travel of the segment, so that when the sliding panel is in its completely closed position, no obstruction is offered to depressing the operating handle to its locked position shown in Figure 3.

Although it has been previously stated that the principal feature of this invention consists in the relatively simple mechanism provided for accomplishing all of the foregoing functions, nevertheless, it is to be understood that various changes in the specific construction, shown herein for the purpose of illustration, may be resorted to without departing from the spirit and scope of this invention, and to this end reservation is made to make such changes as may come within the purview of the accompanying claims.

What I claim as my invention is:

1. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, means mounted on the slidable panel for movement into engagement with a projection on the member aforesaid to secure the panel to said member, and a panel adjusting member operating to also actuate the last named means to move the latter into and out of engagement with the projection on the slidable member.

2. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a hook pivotally mounted on the slidable panel for swinging movement into engagement with a projection on the member aforesaid to secure the panel to said member, a panel adjusting member operating to also actuate the hook to move the latter into and out of engagement with the projection on the slidable member, and means operable in dependence upon movement of the panel adjusting member to disengage the hook from said projection to support the slidable panel in the window opening independent of the supporting means aforesaid.

3. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a fixed auxiliary support for the slidable panel, a hook pivotally mounted on the slidable panel for swinging movement into and out of engagement with a projection on the supporting member to respectively couple the slidable panel to and uncouple the same from the member, a panel adjusting member operating to also actuate the hook to move the latter into and out of engagement with the projection on the slidable member, and means carried by the slidable panel and movable into engagement with the auxiliary support by the panel adjusting member upon operation of the latter to move the hook out of engagement with the projection.

4. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a fixed auxiliary support for the slidable panel, a hook pivotally mounted on the slidable panel for swinging movement into and out of engagement with a projection on the supporting member to respectively couple the slidable panel to and uncouple the same from the member, a panel adjusting member operating to also actuate the hook to move the latter into and out of engagement with the projection on the slidable member, means carried by the slidable panel and movable into engagement with the auxiliary support by the panel adjusting member upon operation of the latter to move the hook out of engagement with the projection, said last named means comprising a segment having a sliding engagement with the auxiliary support, and means restricting movement of the panel adjusting member within limits determined to prevent disengagement of the segment from the support when the slidable member is spaced from the panel.

5. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a fixed auxiliary support for the slidable panel, a hook pivotally mounted on the slidable panel for swinging movement into and out of engagement with a projection on the supporting member to respectively couple the slidable panel to and uncouple the same from the member, a panel adjusting member operating to also actuate the hook to move the latter into and out of engagement with the projection on the slidable member, means carried by the slidable panel and movable into engagement with the auxiliary support by the panel adjusting member upon operation of the latter to move the hook out of engagement with the projection, said last named means comprising a segment having a sliding engagement with the auxiliary support, a stop normally urged into the path of travel of the segment for engagement therewith to restrict rocking movement of the same by the panel adjusting member within limits determined to prevent disengagement of the segment from the auxiliary support when the slidable member is moved out of supporting relation with the panel, and means for automatically moving the stop out of the path of travel of the segment when said member is moved into supporting engagement with the panel.

6. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a hook pivotally mounted on the sliding panel for swinging movement into and out of engagement with a projection on the supporting member to respectively couple the slidable panel to and uncouple the same from the member, a panel adjusting member operating to also actuate the hook to move the latter into and out of engagement with the projection on the slidable member, and a latch element movable into engagement with one side of the slidable panel by the panel adjusting member when the latter is operated to swing the slidable panel to closed position and to engage the hook with said projection.

7. A ventilating window construction for a vehicle body having a window opening therein, a slidable panel pivotally mounted in the opening on substantially vertically arranged pivots for swinging movement out of the plane thereof, actuating means for swinging the pivoted panel, a fixed support to one side of the slidable panel, means carried by the slidable panel and engageable with the support to secure the panel in registration with the window opening including a segment operated by the actuating means aforesaid and having a sliding engagement with the support.

8. A ventilating window construction for a vehicle body having a window opening therein, a slidable panel pivotally mounted in the opening on substantially vertically arranged pivots for swinging movement out of the plane thereof, actuating means for swinging the pivoted panel, a fixed support to one side of the slidable panel, means carried by the slidable panel and engageable with the support to secure the panel in registration with the window opening including a segment operated by the actuating means aforesaid and having a sliding engagement with the support, and a stop normally urged into the path of travel of the segment for engagement therewith to restrict rocking movement of the same by the actuating means within limits determined to prevent disengagement of the segment from the support.

9. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a fixed auxiliary support for the slidable panel, actuating means for swinging the panel about the axis of the pivots aforesaid, means carried by the slidable panel and engageable with the auxiliary support to secure the panel in registration with the window opening when the slidable member is moved out of supporting relation with the panel, said means including a segment operated by the actuating means aforesaid and having a sliding engagement with the auxiliary support, and a stop operable in dependence upon movement of the slidable member out of supporting relation with respect to the panel to restrict rocking movement of the segment by the actuating means within limits determined to prevent disengagement of the segment from the auxiliary support and operable in dependence upon movement of the member into supporting relation with the panel to permit movement of the segment out of engagement with the auxiliary support.

10. A ventilating window construction for a vehicle body having a window opening therein, a slidable panel pivotally mounted in the opening on substantially vertically arranged pivots for swinging movement out of the plane thereof, means for supporting the panel in the window opening including a member mounted for sliding movement relative to the panel, a fixed auxiliary support for the slidable panel, means mounted on the slidable panel for movement into and out of engagement with the supporting member to respectively couple the slidable panel to and uncouple the same from the member, a panel adjusting member operating to also actuate the second named means to move said means into and out of engagement with the slidable member, means carried by the slidable panel and movable into engagement with the auxiliary support upon operation of the panel adjusting member to uncouple the second named means from the slidable member, and means preventing disengagement of the auxiliary support engaging means from the auxiliary support when the slidable member is in non-supporting relation with respect to the pivoted panel.

11. A ventilating window construction for a vehicle body having a window opening therein, a slidable panel pivotally mounted in the opening on substantially vertically arranged pivots for swinging movement out of plane of the opening, means for supporting the panel in the window opening including a member mounted for slidable movement relative to the panel, a fixed auxiliary support for the slidable panel, an element mounted on the slidable panel for movement into and out of engagement with the supporting member to respectively couple the slidable panel to and uncouple the same from said member, means for adjusting the panel including a member operable to also actuate said element to move the latter into and out of engagement with the slidable member, means carried by the slidable panel and movable into engagement with the auxiliary support upon operation of the panel adjusting member to uncouple the element from the slidable member, means preventing disengagement of the last named means from the auxiliary support when the slidable member is in non-supporting relation to the pivoted panel, and means responsive to movement of the slidable member into supporting relation with the pivoted panel to render the last mentioned means inoperative.

12. A ventilating window construction for a vehicle body having a window opening therein, a slidable panel pivotally mounted in the window opening on substantially vertically arranged pivots for swinging movement out of the plane of the opening, actuating means for swinging the pivoted panel, a fixed support at one side of the panel, means carried by said panel and movable into and out of engagement with the support, said means comprising an element operatively connected to the actuating means aforesaid for operation by the latter means, and means effective when said element is in engagement with the support to restrict movement of the element by the panel actuating means within limits sufficient to permit adjusting of the pivoted panel and insufficient to permit disengagement of the element from the support.

13. A ventilating window construction for a vehicle body having a window opening therein, a slidable panel pivotally mounted in the window opening on substantially vertically arranged pivots for swinging movement out of the plane of the opening, a fixed support at one side of the panel, an element carried by the panel and movable relative thereto into and out of engagement with the support, means effective when the element is in engagement with the support to restrict movement of the element within limits determined to prevent disengagement of the element from the support, a member mounted for sliding movement relative to the panel into and out of supporting relation to the panel, said member operable upon movement into supporting relation with the panel to render the last named means inoperative to limit the extent of movement of the element and thereby permit disengagement of the latter from said support.

HAROLD G. THUNDER.